(12) United States Patent
Xu

(10) Patent No.: US 9,981,537 B2
(45) Date of Patent: May 29, 2018

(54) TRUCK COVER SYSTEM

(71) Applicant: Cixi City Liyuan Auto Parts Co., Ltd., Cixi (CN)

(72) Inventor: Enli Xu, Cixi (CN)

(73) Assignee: CIXI CITY LIYUAN AUTO PARTS CO., LTD., Cixi (CN)

( * ) Notice: Subject to any disclaimer, the term of this patent is extended or adjusted under 35 U.S.C. 154(b) by 0 days. days.

(21) Appl. No.: 15/431,790

(22) Filed: Feb. 14, 2017

(65) Prior Publication Data

US 2018/0111460 A1  Apr. 26, 2018

(30) Foreign Application Priority Data

Oct. 21, 2016  (CN) .......................... 2016 1 0918978

(51) Int. Cl.
*B60J 7/10* (2006.01)
*B60J 7/185* (2006.01)

(52) U.S. Cl.
CPC ............. *B60J 7/104* (2013.01); *B60J 7/1858* (2013.01)

(58) Field of Classification Search
CPC ................................ B60J 7/104; B60J 7/1858
USPC ....................... 296/100.16–100.18
See application file for complete search history.

(56) References Cited

U.S. PATENT DOCUMENTS

| | | | | |
|---|---|---|---|---|
| 6,752,449 B1 * | 6/2004 | Wheatley | ................. | B60J 7/102 296/100.17 |
| 7,900,990 B2 * | 3/2011 | Townson | .............. | B60P 7/0815 296/100.16 |
| 7,954,876 B2 * | 6/2011 | Kosinski | ................. | B60J 7/102 296/100.17 |
| 8,128,149 B1 * | 3/2012 | Wolf | .......................... | B60J 7/10 160/371 |
| 2008/0106114 A1 * | 5/2008 | Wheatley | ................. | B60J 7/061 296/100.17 |
| 2017/0129316 A1 * | 5/2017 | Williamson | ............. | B60J 7/068 |

\* cited by examiner

*Primary Examiner* — Dennis H Pedder
(74) *Attorney, Agent, or Firm* — Kilpatrick Townsend & Stockton LLP

(57) ABSTRACT

A truck cover system that includes a rail that couples to a truck. The rail includes a rail body with a cover slot that couples to a cover and a wall that extends away from the rail body with alignment indicia. A latch system couples to the rail. The latch system includes a latch housing that includes a tongue aperture. A tongue moves axially within the tongue aperture. A tongue fastener couples to the tongue to secure the tongue to the latch housing. A spring surrounds a portion of the tongue fastener and axially biases the tongue into engagement with the rail. A latch positioner couples to the rail and to the latch housing to enable rotation of the latch housing while the alignment indicia facilitates alignment of the latch positioner on the rail.

10 Claims, 4 Drawing Sheets

US 9,981,537 B2

TRUCK COVER SYSTEM

FIELD OF THE INVENTION

The disclosure generally relates to a compartment cover system for trucks.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Pickup trucks are widely used vehicles that enable transportation of cargo as well as passengers. Passengers are typically housed in the truck cab while cargo can be stored in the truck bed. The truck bed is usually rectangularly shaped and open to the environment to facilitate loading and carrying of large and/or oddly shaped cargo. However, exposing the truck bed to the environment may leave the truck bed and/or cargo unprotected. For example, the truck bed and/or cargo may be exposed to dirt, precipitation (e.g., rain, snow, hail), etc. Accordingly, some truck owners purchase truck covers to protect the truck bed as well as items stored in the truck bed.

SUMMARY OF THE INVENTION

The present disclosure is directed to a truck cover system. The truck cover system includes a rail that couples to a truck. The rail includes a rail body with a cover slot that couples to a cover and a wall that extends away from the rail body. The rail body includes alignment indicia. A latch system couples to the rail. The latch system includes a latch housing that includes a tongue aperture. A tongue moves axially within the tongue aperture. A tongue fastener couples to the tongue to secure the tongue to the latch housing and a spring surrounds a portion of the tongue fastener and axially biases the tongue into engagement with the rail. A latch positioner couples to the rail and to the latch housing to enable rotation of the latch housing while the alignment indicia facilitates alignment of the latch positioner on the rail.

An aspect of the disclosure includes a truck cover system with a rail that couples to a truck. The rail includes a rail body with a cover slot that couples to a cover that extends over a truck bed and a wall that extends away from the rail body with alignment indicia. A latch system couples to the rail to tension the cover. A latch positioner couples to the rail and to the latch system, while the alignment indicia facilitate alignment of the latch positioner on the rail.

BRIEF DESCRIPTION OF THE DRAWINGS

Various features, aspects, and advantages of the present invention will be better understood when the following detailed description is read with reference to the accompanying figures in which like characters represent like parts throughout the figures, wherein.

DETAILED DESCRIPTION

One or more specific embodiments of the present invention will be described below. These embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The embodiments discussed below include a truck cover system with a rail that includes indicia (e.g., symbols, numbers, or a combination thereof) that facilitate alignment of latch systems for tensioning a cover. In other words, the indicia may facilitate parallel alignment of latch systems. The truck cover system may also include a latch system with a latch housing that that receives and enables a tongue to move axially within the latch housing. The latch housing enables the removal of the tongue in a first direction while blocking removal of the tongue in a second direction.

Figure 1:
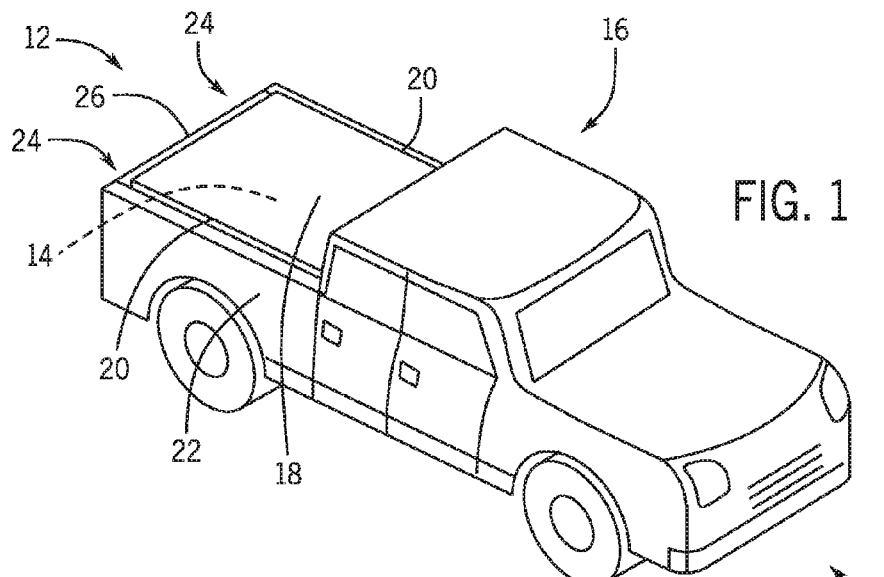
FIG. 1 is a perspective view of an embodiment of a truck with a truck cover system.

FIG. 1 is a perspective view of an embodiment of a truck 10 with a truck cover system 12. As illustrated, the cover system 12 covers the compartment 14 formed by the truck bed 16 to protect an interior of the truck bed 16 and items that may be stored in the compartment 14. For example, the cover system 12 may block dirt and precipitation from entering the truck bed 16. The cover system 12 includes a cover 18 (e.g., soft cover) that extends over the compartment 14. The cover 18 may be made out of a variety of materials including fabric, plastic (e.g., vinyl), etc. The cover 18 couples to the truck bed 16 with rails 20 that in turn couple to truck walls 22 (e.g., truck bed walls). To block removal of the cover 18 and/or access to the truck bed 16, the cover system 12 includes one or more latch systems 24. For example, the cover system 12 may include two latch systems 24 one at each corner of the truck bed 16 next to the tailgate 26. In operation, the latch systems 24 couple to the rails 20 to tension/pull the cover 18 into an extended position (e.g., taught position) that facilitates the flow of precipitation off of the cover system 12 as well as enhancing the aesthetic appearance of the cover system 12.

Figure 2:
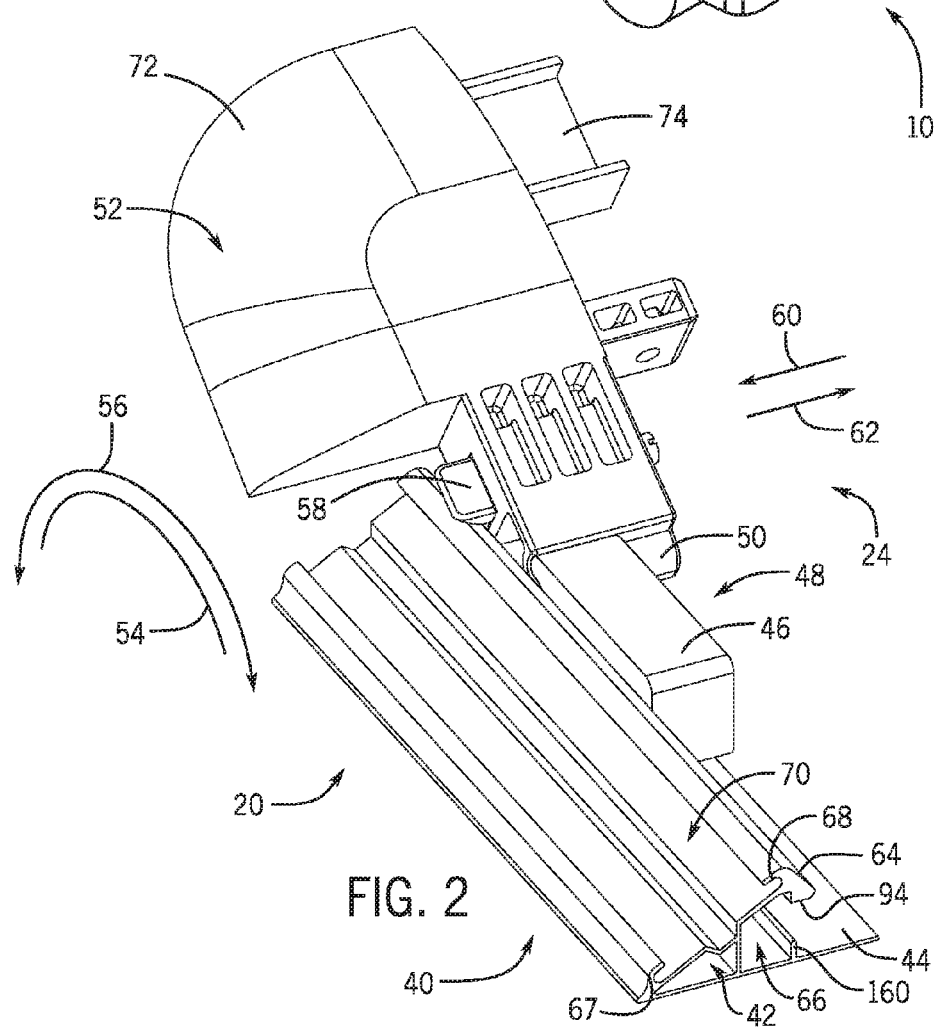
FIG. 2 is a rear partial perspective view of an embodiment of a truck cover system with a latch system in an unlatched position.

FIG. 2 is a rear partial perspective view of an embodiment of a truck cover system 12 (without the cover 18) with a latch system 24 in an unlatched position. As illustrated, the rail 20 has a body 40 (e.g., rail body) that includes a cover slot 42 and a rail wall 44 that couples to the truck 10. In some embodiments, a weather seal (e.g., rubber, plastic) may rest between the rail wall 44 and the truck wall 22 to block dirt, precipitation, etc. from entering the truck bed 16 between the rail 20 and the truck wall 22. The weather seal may also double as a cushion that protects a surface of the truck wall 22 (e.g., protect the paint job).

As explained above, the cover system 12 includes a latch system 24 that couples to the rails 20 to tension and secure the cover 18 to the truck 10. In order to couple the latch system 24 to the rail 20, the cover system 12 includes a latch positioner 46. The latch positioner 46 includes a curved slot 48 that receives and enables a curved end 50 of a latch housing 52 to rotate and couple to the rail 20. For example, the latch housing 52 rotates about the latch positioner 46 in direction 54 to secure the latch system 24 to the rail 20, and releases as the latch housing 52 rotates in direction 56.

To secure the latch system 24 to the rail 20, the latch system 24 includes a tongue 58. The tongue 58 moves axially in and out of the latch housing 52 in axial directions 60 and 62 to engage and disengage from the rail 20. For example, as the latch housing 52 rotates in direction 54 the tongue 58 contacts the surface 64 (e.g., slanted, tapered, curved surface) on the rail body 40. The surface 64 drives the tongue 58 into the latch housing 52 in axial direction 62. Once the latch housing 52 rotates past the surface 64, the tongue 58 extends out of the latch housing 52 in axial direction 60 and into the tongue slot 66. In this position, the tongue 58 couples/secures the latch system 24 to the rail 20.

While the cover 18 is not shown in FIG. 2, the cover 18 couples to the latch system 24 enabling the latch system 24 to tension the cover 18 into an extended position. After extending/tensioning the cover 18, the cover 18 facilitates the flow of precipitation and enhances the aesthetic appearance of the cover system 12. The cover 18 couples to the rail 20 by sliding an end of the cover 18 into the cover slot 42. The cover slot 42 is formed by the rail 20 with first and second curved portions 67, 68 (e.g., hooks) on opposite sides of a recess 70.

In some embodiments, the latch housing 52 may include a curved surface 72 that facilitates the flow of precipitation off of the truck 10, enhances the appearance of the cover system 12, and facilitates handling (e.g., opening of the cover system 12). The latch housing 52 may also include a connector 74 that extends away from the latch housing 52. The connector 74 enables the latch system 24 located at one corner of the truck bed 16 to connect to the opposing latch system 24 located at a parallel corner of the truck bed 16. For example, a bar may couple to the connectors 74 to connect the latch systems 24.

Figure 3:
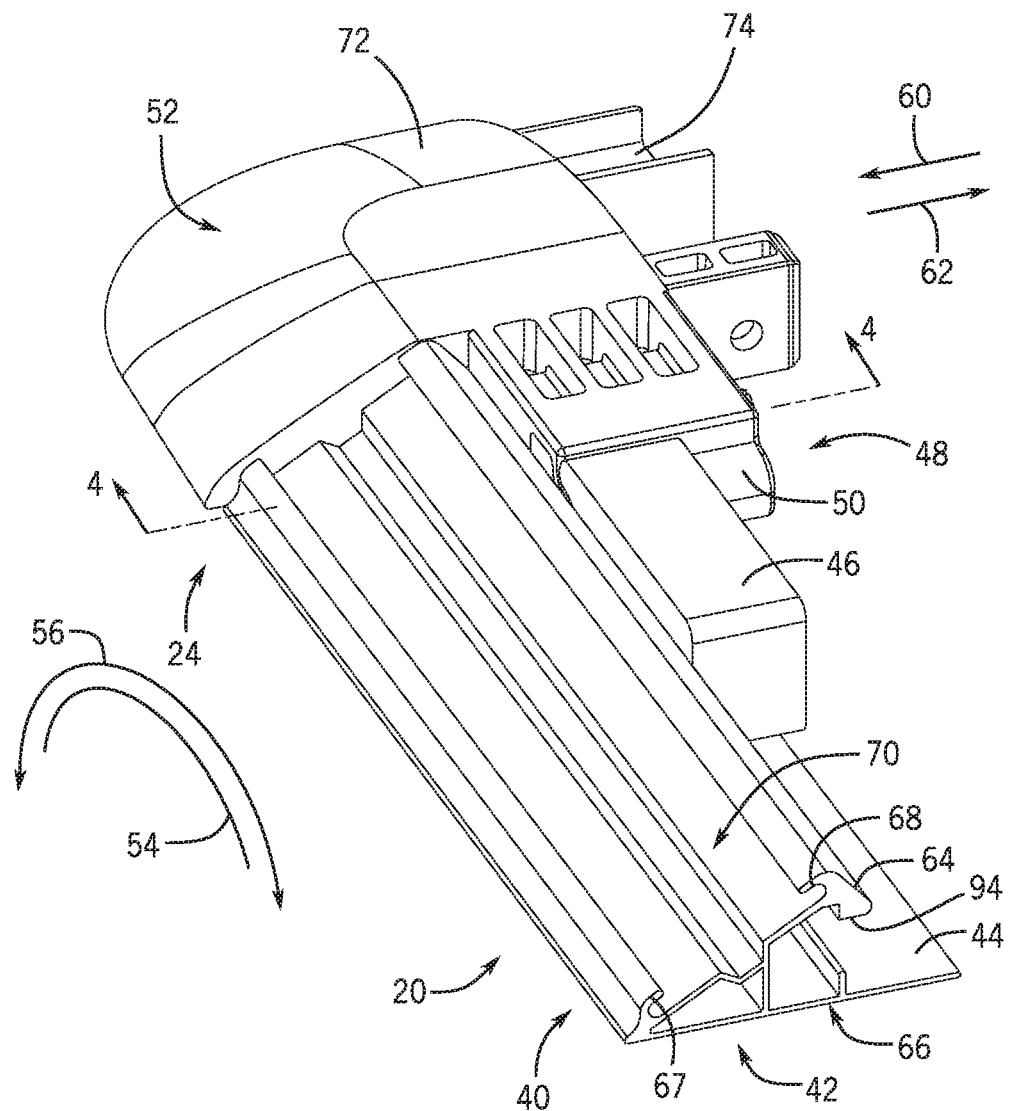
FIG. 3 is a rear partial perspective view of an embodiment of a truck cover system with a latch system in a latched position.

FIG. 3 is a rear partial perspective view of an embodiment of a truck cover system 12 coupled to a truck wall 22 with the latch system 24 in a latched position. As explained above, the tongue 58 moves axially in and out of the latch housing 52 in axial directions 60 and 62 to engage and release from the rail 20. As the latch housing 52 rotates in direction 54, a surface 90 (e.g., tapered, slanted, curved surface) (see FIG. 4) of the tongue 58 contacts the surface 64 on the rail body 40. The surface 64 drives the tongue 58 in axial direction 62 and into the latch housing 52. After the latch housing 52 rotates past the surface 64, the tongue 58 extends out of the latch housing 52 in axial direction 60 and into the tongue slot 66 to lock the latch system 24 in place. In the latched position, a surface 92 (e.g., flat) on the tongue 58 contacts a latch retention surface 94 (see FIGS. 2 and 4) on the rail 20 that blocks the tongue 58 and thus rotation of the latch housing 52. Without user intervention to disengage the tongue 58 from the tongue slot 66, the latch system 24 remains in the latched position.

Figure 4:
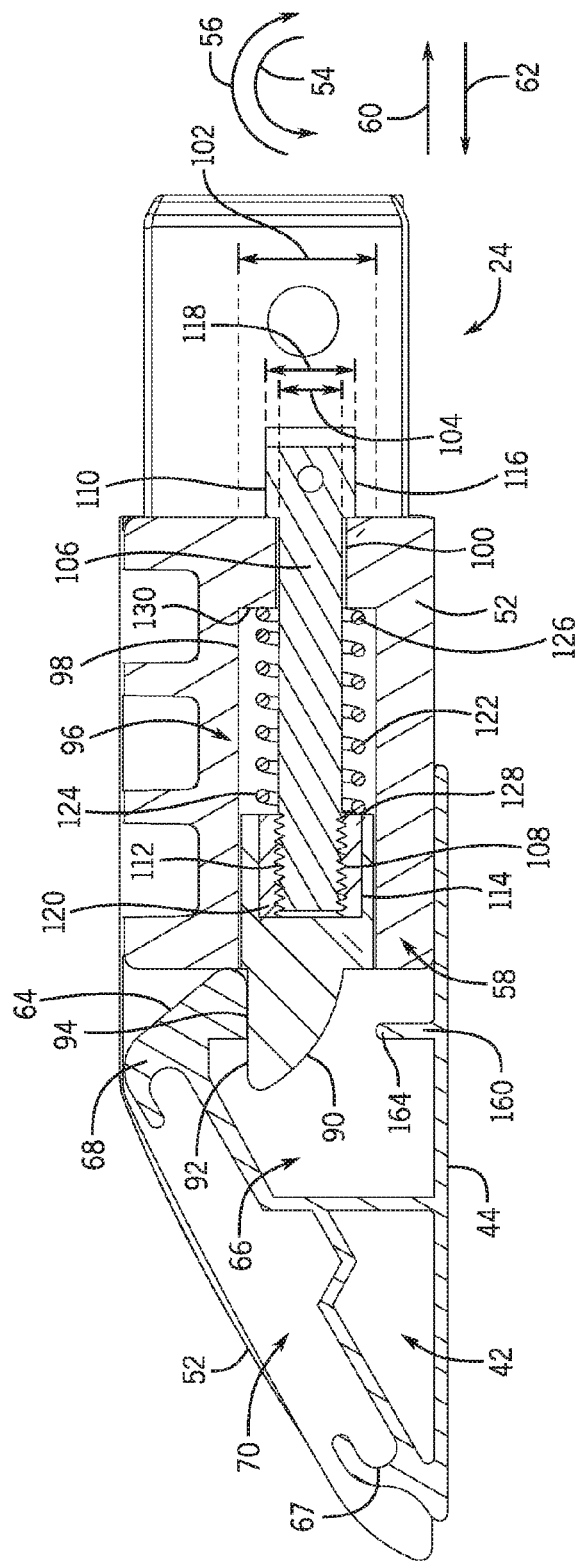
FIG. 4 is a cross-sectional view of an embodiment of a latch system along line 4-4 of FIG. 3.

FIG. 4 is a cross-sectional view of an embodiment of a latch system 24 along line 4-4 of FIG. 3. As illustrated, the latch housing 52 includes an aperture 96 (e.g., tongue aperture) with a counterbore portion 98 and a thru-hole portion 100. The counterbore portion 98 has a diameter 102 that is greater than a diameter 104 of the thru-hole portion 100. The difference in diameters 102 and 104 enables the latch housing 52 to receive the tongue 58 and block removal of the tongue 58 in axial direction 62. A fastener 106 couples to the tongue 58 and includes a first end 108 and a second end 110. The first end 108 defines a threaded portion 112 that threadingly couples to an aperture 114 inside of the tongue 58. The second end 110 of the fastener 106 defines an enlarged head portion 116 with a diameter 118 that is larger than the diameter 104 of the thru-hole portion 100 to block removal of the fastener 106 from the latch housing 52 in axial direction 60. In some embodiments, the aperture 114 in the tongue 58 may receive a threaded bushing 120 that is welded, glued, press fit, or otherwise coupled to the tongue 58. Therefore, instead of coupling directly to the tongue 58, the fastener 106 threadingly couples to the threaded bushing 120.

Surrounding the fastener 106 between the first end 108 and the second end 110 is a spring 122 (e.g., helical spring). The spring 122 has a first end 124 and a second end 126 with the first end 124 contacting a rear face 128 of the tongue 58 and the second end 126 contacting a counterbore face 130.

In operation, the spring 122 biases the tongue 58 away from the counterbore face 130 in axial direction 60. However, when a force greater than the spring force of the spring 122 contacts the tongue 58, the spring 122 compresses in axial direction 62 between the tongue 58 and counterbore face 130. As the spring 122 compresses, the fastener 106 slides in axial direction 62 through the thru-hole portion 100, which drives the tongue 58 into the latch housing 52. Once the force is removed, the spring 122 biases the tongue 58 in axial direction 60, so that a portion of the tongue 58 extends out of the latch housing 52 (e.g., extends into the tongue slot 66).

Figure 5:
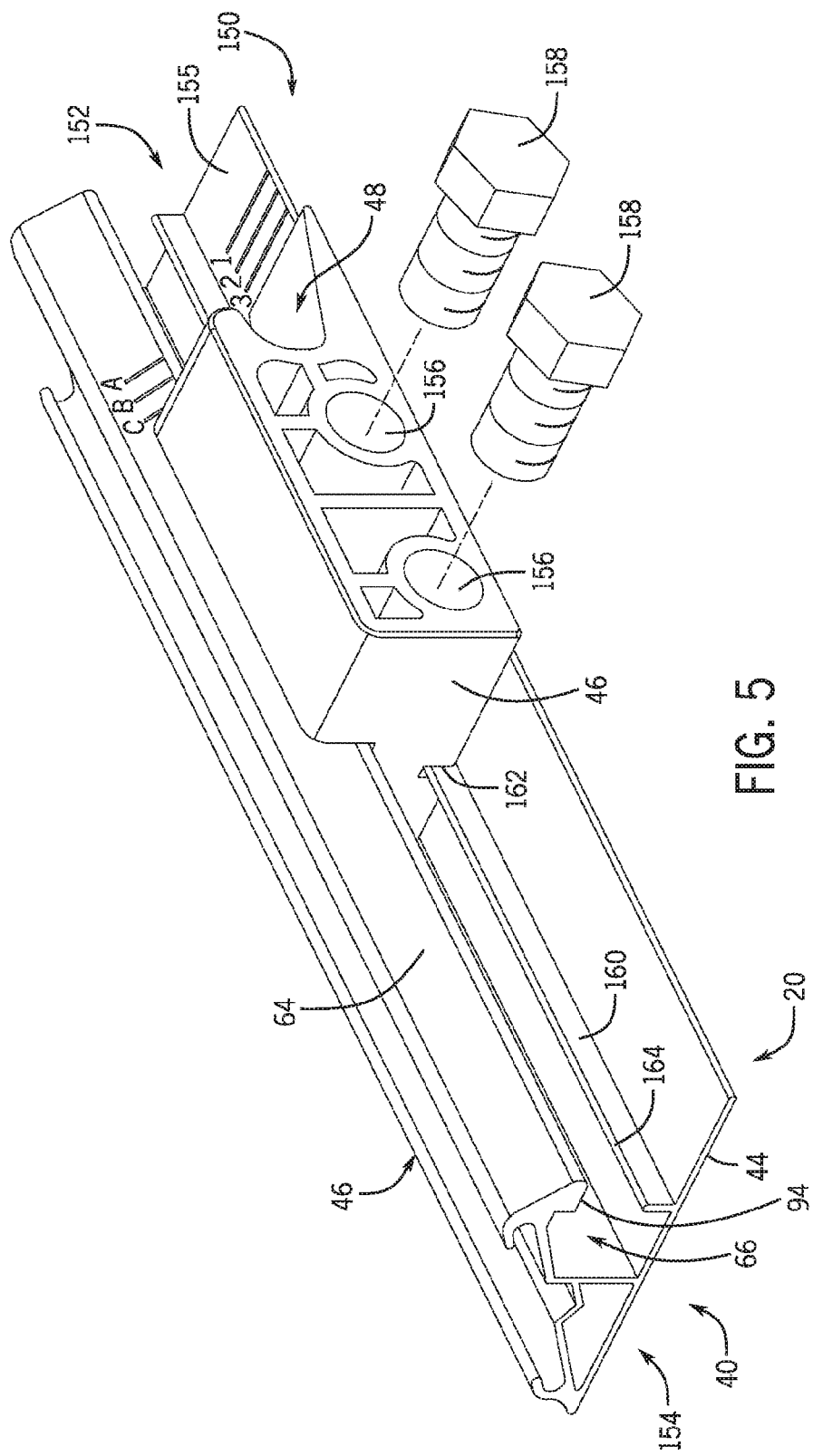
FIG. 5 is a partial perspective view of an embodiment of the truck cover system without the latch system.

FIG. 5 is a perspective view of an embodiment of the truck cover system 12 without the latch system 24. As explained above, the cover system 12 may include two latch systems 24 one for each rail 20. In order to properly tension the cover 18, the latch systems 24 should align with one another (e.g., be parallel). To facilitate alignment, the rail 20 includes indicia 150 (e.g., measurement, alignment indicia) that enable a user to easily determine the position of the latch positioner 46 with respect to an end 152, 154 of the rail 20. The indicia 150 may be located on a surface 155 of the rail wall 44 and/or positioned at another location. For example, the indicia 150 may be on the surface 64 of the rail 20. The indicia 150 may be a symbol such as lines and/or other shapes (e.g., circles, triangles, squares). In some embodiments, the indicia 150 may be words and/or numbers. For example, numbers may represent measurements (e.g., inches, mm) from an end 152, 154 or a simple number (e.g., 1, 2, 3) that indicates a position with respect to the rail 20. In some embodiments, the indicia 150 may be a combination of shapes, words, and numbers, or a subset thereof. In operation, a user can easily determine the position of each latch positioner 46 by referring to the indicia 150, thus avoiding the need to separately measure a distance from an end 152, 154 of each rail 20 in order to align the latch positioners 46.

After aligning the latch positioner 46, the latch positioner 46 is coupled to the rail 20. In some embodiments, the latch positioner 46 defines one or more apertures 156 that receive fasteners 158 (e.g., screws, bolts) that threadingly engage the tongue slot 66. In some embodiments, the fasteners 158 engage a protrusion 160 (e.g., alignment protrusion) that extends from the rail wall 44. As the fasteners 158 engage the protrusion 160, the fasteners 158 compress the latch positioner 46 against the rail 20 (e.g., rail body 40, the protrusion 160, or a combination thereof). In some embodiments, the latch positioner 46 includes a slot 162 that receives the protrusion 160. The rail 20 may therefore facilitate alignment and retention of the latch positioner 46 as the latch positioner 46 moves/slides between the ends 152, 154 of the rail 20 over the protrusion 160. In some embodiments, the protrusion 160 is rectangular in shape with a rounded end 164. In other embodiments, the protrusion 160 may be square, semi-circular, etc.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A truck cover system, comprising:
   a rail configured to couple to a truck, the rail comprising:
   a rail body defining a cover slot configured to couple to a cover that extends over a truck bed;
   a wall extending away from the rail body with alignment indicia;
   a latch system configured to couple to the rail, the latch system, comprising:
   a latch housing comprising a tongue aperture;
   a tongue configured to move axially within the tongue aperture;
   a tongue fastener coupled to the tongue to secure the tongue to the latch housing, wherein the tongue fastener couples to the tongue;
   a spring surrounding a portion of the tongue fastener, wherein the spring axially biases the tongue into engagement with the rail; and
   a latch positioner configured to couple to the rail and to the latch housing to enable rotation of the latch housing, wherein the alignment indicia facilitate alignment of the latch positioner on the rail.

2. The system of claim 1, wherein the rail comprises an alignment protrusion that extends from the wall.

3. The system of claim 2, wherein the alignment protrusion is substantially perpendicular to the wall.

4. The system of claim 2, wherein the alignment protrusion extends from a first end of the rail to a second end of the rail.

5. The system of claim 2, wherein the latch positioner comprises a slot that receives the alignment protrusion, wherein the latch positioner is configured to align by sliding axially over the alignment protrusion.

6. The system of claim 1, wherein the rail defines a tongue slot that receives the tongue in a latched position.

7. The system of claim 6, wherein the latch positioner defines an aperture that receives a fastener, wherein the fastener is configured to extend through the aperture and into the tongue slot to couple the latch positioner to the rail.

8. The system of claim 1, wherein the tongue aperture comprises a thru-hole portion and a counterbore portion, and wherein the thru-hole portion allows a first end of the tongue fastener to enter the counterbore portion and blocks a second end of the tongue fastener from entering the counterbore portion.

9. The system of claim 1, wherein the spring is a helical spring.

10. The system of claim 1, wherein the alignment indicia comprise at least one of numbers, letters, and symbols.

* * * * *